United States Patent Office 3,625,031
Patented Dec. 7, 1971

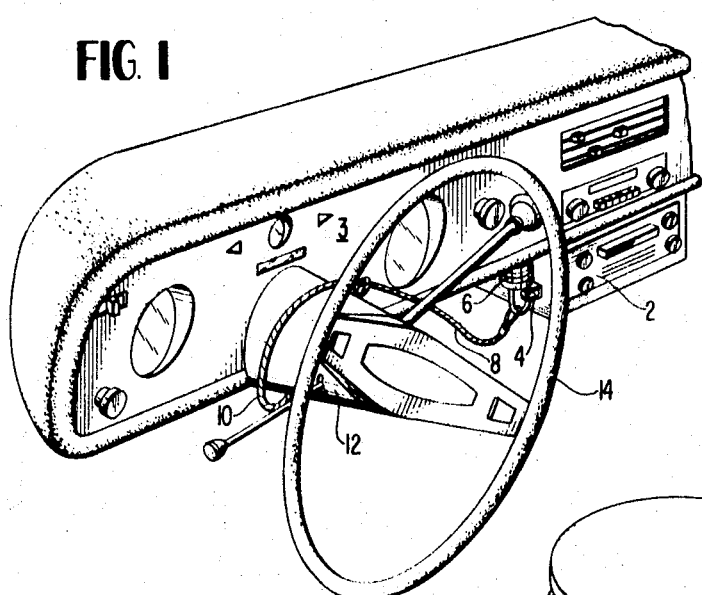
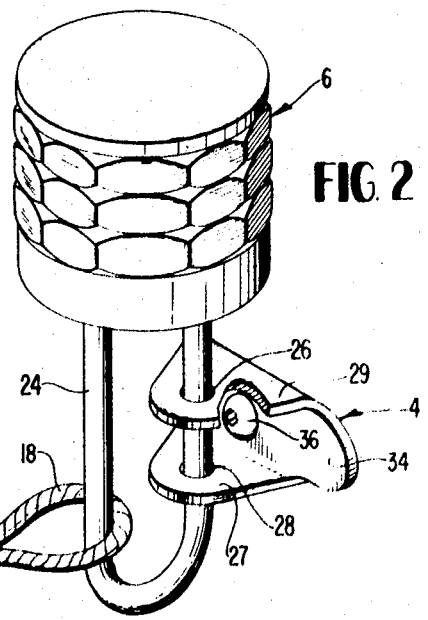
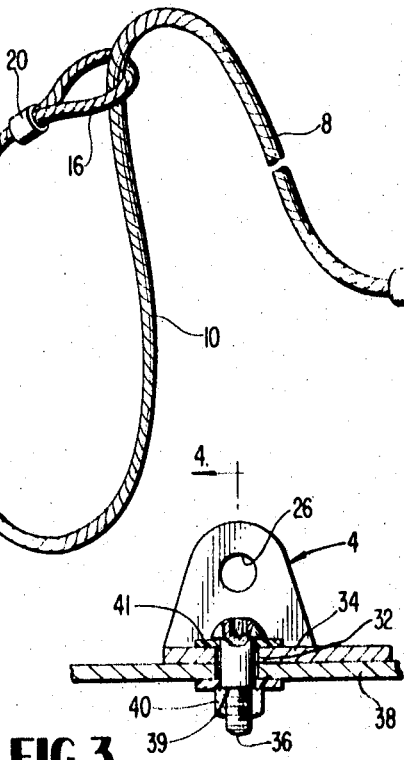
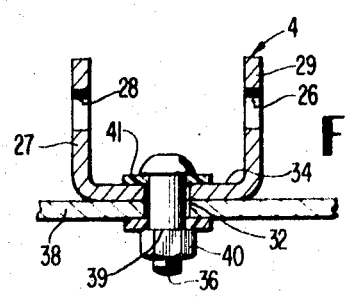

3,625,031
APPARATUS FOR PREVENTING THEFT OF PORTABLE ARTICLES
Granville M. Alley III, P.O. Box 1427,
Tampa, Fla. 33601
Filed Sept. 25, 1969, Ser. No. 861,069
Int. Cl. E05b 65/12, 73/00
U.S. Cl. 70—58                                    10 Claims

ABSTRACT OF THE DISCLOSURE

Unauthorized removal of a portable article from a vehicle is prevented by attaching the article to the vehicle steering column with a flexible elongated cable. An adjustably-sized loop at one end of the cable encircles the steering column, and the other end of the cable is connected to a lock which engages a bracket on the portable article. The bracket is attached to the portable article by a fastener which has a threaded shank and a recessed head for receiving a fastener-rotating tool. Access to the recess by a tool is obstructed by a pin on the lock which passes through apertures in the bracket.

---

This invention involves apparatus for preventing the unauthorized carrying-away of portable articles. In the preferred and disclosed embodiment, the invention is employed to prevent the theft of portable articles from automobiles.

It is well known that a parked automobile, either locked or unlocked, is a common target for thieves. This is due in part to the visibility of articles through the vehicle window. A particularly vulnerable article is a tape deck mounted beneath the automobile dashboard since it is always visible from the exterior of the car and it is easily detached by using conventional hand tools.

There have been various proposals for locking tape decks within their mountings and for preventing the theft of other articles of a portable nature. These prior devices are sometimes complicated and involve expensive modifications.

Contrasted to prior art devices of this type, the present invention is a simple, convenient and inexpensive apparatus which will prevent the unauthorized removal of portable articles. The word "portable" is meant to describe those articles, whether attached or unattached to another structure, which are capable of being lifted and carried away by one man. This definition encompasses portable electronic equipment such as stereo tape decks, automobile radios and aircraft instruments. It also includes articles such as air conditioners and expensive photographic equipment. These articles may be located in vehicles such as automobiles, boats or airplanes; or, they may be located within or adjacent to stationary structures.

An important feature of this invention is the bracket locking assembly which is attached to the portable article. This bracket has a base portion which is apertured to receive a rotatable fastener which attaches the bracket to the portable article. An upstanding portion on the bracket is provided with an aperture for receiving a locking pin and holding it across the fastener head to prevent access by a fastener-rotating tool to the recess in the fastener head. With this arrangement, the bracket is held on the article by the rotatable fastener, and the presence of the locking pin across the fastener head prevents a thief from inserting a fastener-rotating tool in the fastener head and removing the bracket from the portable article.

An aspect of the invention which is particular to locations where there is an automobile steering column or other anchoring member which may be encircled is the manner in which the cable or other flexible elongated member is secured to the anchoring member. This connection involves an adjustably-sized loop at one end of the elongated member where it encircles the anchoring member, while the other end of the cable is attached to the article by a lock.

A preferred form of the invention is shown in the accompanying drawings wherein

FIG. 1 is a perspective view showing the apparatus attaching a stereo tape deck to the steering column of an automobile;

FIG. 2 is an enlarged view of the lock, bracket and cable when used in a preferred manner;

FIG. 3 is a side elevational view of the bracket of the invention when attached to an article; and FIG. 4 is a sectional view taken along the line of 4—4 in FIG. 3.

FIG. 1 shows a portion of an automobile interior when a stereo tape deck 2 is mounted in a conventional fashion below the dash 3. A bracket 4 on the side of the tape deck 2 receives the shackle of a conventional padlock 6. The padlock 6 is also attached to one end of a flexible elongated member such as cable 8 which has an adjustably-sized loop 10 at its other end for encircling the steering column 12. The length of the cable 8 is limited so that the maximum size of the adjustable loop 10 renders it incapable of passing from the steering column 12 over the steering wheel 14 of the vehicle even when the tape deck 2 is detached from the dash 3. In the case of a circular steering wheel 14, the maximum size of the loop 10 should be no greater than $$D + \frac{c}{2}$$

where D is the diameter of the steering wheel and c is its circumference.

Referring to FIG. 2, it will be seen that the cable 8 is provided with eyes 16 and 18 at its opposite ends. These eyes may be formed of the cable itself by using crimped connectors 20 and 22, or they may be separate fittings attached to the ends of the cable. The adjustably-sized loop 10 is formed by passing the eye 18 through the eye 16 so that a midportion of the cable 8 is movably received within the eye 16.

The eye 18 of cable 8 receives the shackle 24 of the padlock 6. One leg of the shackle 24 serves as a locking pin as it passes through spaced apart apertures 26 and 28 in the article-carried bracket 4. The locking mechanism may be of any suitable type and it is located in the head 30 of the padlock.

The bracket 4 has a flat base portion 34 adapted to lie against a surface of the portable article 2. As best shown in FIGS. 3 and 4, an aperture 32 in the base portion 34 of the bracket receives a fastener such as bolt 36 which passes through the wall 38 of the article and receives the nut 40. The fastener is preferably of the Allen-head type, with the periphery of its head being smooth, preferably of a circular transverse cross section, to prevent it from being gripped and easily turned by pliers or others tools. The recess is axially oriented and hexagonal in transverse cross section, with side walls lying in planes parallel to the longitudinal axis of the fastener. The shank of the fastener is provided with threads or other means for securing the shank to an article upon rotational movement. These threads extend only partially up the shank in order to provide a shoulder 39 against which a nut 40 may seat.

Initial attachment of the bracket 4 to the wall 38 of a portable article simply involves passing the shank of the fastener through aligned apertures in the base 34 and the wall 38, placing the nut 40 on the fastener and using a conventional fastener-rotation tool such as an Allen wrench for tightening the bracket 4 in position. The nut 40 will firmly seat against the shoulder 39 before the wall 38 is gripped between the fastener head and the nut. This is important since it will permit turning of the bracket freely on the fastener, thereby preventing unauthorized persons from loosening the fastener by turning the bracket. Free rotation of the bracket is also promoted by the presence of the two low friction washers 41 which may be made of self-lubricating nylon.

Removal of the bracket by engaging and rotating the fastener 36 with a fastener-rotating tool is not possible when the locking pin portion of padlock shackle 24 extends through the openings 26 and 28 on the upstanding ears 27 and 29 of the bracket. This is because the presence of the padlock shackle pin will prevent a fastener-rotating tool from engaging the fastener 36. Rotation of the fastener and removal of the bracket 4 from the portable article 2 is thereby prevented.

Assuming that the bracket 4 is already attached to a portable article in the manner described in the foregoing description, the attachment of the cable 8 to the steering wheel and to the bracket 4 is a simple matter. The cable 8 is bent into a U-configuration around the steering column and one eye 18 is passed through the other eye 16 in order to form the closed adjustably-sized loop around the steering column 12. The shackle 24 of the unloaded padlock 6 is passed through eye 18. Then, one leg of shackle 24 is inserted through the apertures 26 and 28 in the upstanding portions 27 and 29 of the bracket 4. The padlock is snapped into its locked position. The locking pin will prevent a fastener-rotating tool from engaging the recess in the head of fastener 36, thereby preventing removal of the fastener 36 and the bracket 4 from the portable article 2.

This invention envisions various modifications which are not illustrated. As discussed above, the portable article may be any of a great variety of devices other than the tape deck 2. The adjustably sized loop 10 may be used to encircle other structural anchoring members, either in vehicles, in buildings or in open areas. The locking pin which passes through the apertures 26 and 28 may be a single elongated pin which has an aperture for receiving the shackle of a padlock or some other locking mechanism. The cable 8 may be permanently attached to the locking pin.

From the foregoing description of the invention, it will be appreciated that I have devised a new and useful device for preventing the theft of portable articles.

It may be inexpensively manufactured, easily attached to a portable article and conveniently used to anchor a portable article to many types of structures.

I claim:

1. Apparatus for preventing the theft of a portable article, comprising,
a bracket having a base portion and spaced apart upstanding portions, said upstanding portions having apertures which are aligned with each other along an axis generally parallel to the base portion, said base portion having an aperture located between the upstanding portions in a plane which passes through said axis and is perpendicular to said base portion,
a fastener for attaching the bracket to an article, said fastener having a head lying between the upstanding portions of the brackets and a shank passing through the aperture in the base portion, means for securing the shank to an article upon rotary movement thereof, the head having a recess for receiving a fastener-rotating tool,
a pin passing through the apertures in the upstanding portions of the bracket to provide an obstruction which prevents access by a fastener-rotating tool to the recess in the fastener, lock means attached to the pin to prevent its unauthorized removal from the bracket, and
means for tethering the pin to an anchoring member to prevent unauthorized removal of the bracket and an article attached thereto.

2. Apparatus according to claim 1 including a padlock having a locking mechanism and a shackle, wherein the shackle constitutes the pin and the locking mechanism constitutes the lock means.

3. Apparatus acording to claim 2 wherein the tethering means is an elongated flexible member having one end connected to the pin and another end provided with an adjustably-sized loop.

4. Apparatus according to claim 3 in combination with an automobile having a steering column and a steering wheel, and also in combination with a portable article which is a portable electronic appliance, said loop encircling the steering column, with the adjustably-sized loop having a maximum size incapable of being removed from the steering column by passing it over the steering wheel.

5. Apparatus according to claim 1 wherein the recess in the fastener head has a polygonal transverse cross section.

6. Apparatus according to claim 5 wherein the recess in the fastener has internal walls which are perpendicular to the base portion of the bracket.

7. Apparatus for preventing the unauthorized removal of portable articles, comprising,
a bracket having an upstanding portion and a base portion which is adapted to lie against the portable article,
an aperture in the base portion,
only one threaded fastener passing through the aperture in the base portion for attaching the bracket to a portable article, said fastener having a shank which is attached to an article by rotational movement about its longitudinal axis, said fastener having a head with an axially facing recess for receiving a fastener-rotating tool,
said bracket being freely rotatable about the fastener axis to prevent disconnection of the fastener from the article by rotation of the bracket,
aperture means in the upstanding portion of the bracket for receiving a locking pin and maintaining the locking pin in a fixed orientation across the recess in the fastener head to prevent the access of a fastener-rotating tool to the recess in the fastener head.

8. The apparatus of claim 7 having a flexible elongated member connected to the bracket to permit tethering of the bracket and the attached article to an anchoring member.

9. The apparatus of claim 8 wherein the flexible elongated member has an adjustably-sized loop for encircling an anchoring member.

10. Apparatus for preventing the theft of a portable article from a vehicle having a steering column and a steering wheel, comprising,
a flexible elongated member having eyes at each end, said elongated member having a portion between the eyes passing through one of the eyes to form an adjustably-sized loop at one end of the elongated member, said loop encircling the steering column, and lock means releasably attaching the other eye to a bracket on the portable article, said bracket having the following structure:

an upstanding portion and a base portion which is adapted to lie against the portable article, an aperture in the base portion, a fastener passing through the aperture in the base portion for attaching the bracket to a portable article, said fastener having a shank which is attached to an article by rotational movement about its longitudinal axis, said fastener having a head with an axially facing recess for receiving a fastener-rotating tool, said bracket being rotatable about the fastener axis to prevent disconnection of the fastener from the article by rotation of the bracket, and aperture means in the upstanding portion of the bracket for receiving a pin of the lock means and maintaining the pin in a fixed orientation across the recess in the fastener head to prevent the access of a fastener-rotating tool to the recess in the fastener head.

References Cited

UNITED STATES PATENTS

| | | | |
|---|---|---|---|
| 3,496,742 | 2/1970 | Rothweiler | 70—232 |
| 1,274,203 | 7/1918 | Sager | 211—4 |
| 3,091,011 | 5/1963 | Campbell | 70— 58 X |
| 3,410,122 | 11/1968 | Moses | 70—58 |
| 3,410,580 | 11/1968 | Longenecker | 280—507 |
| 3,434,312 | 3/1969 | Buchman | 70—58 |

ROBERT L. WOLFE, Primary Examiner

U.S. Cl. X.R.

70—231, 258, DIG 57